United States Patent Office 2,910,463
Patented Oct. 27, 1959

2,910,463

PHENYLAZO FORMAMIDES AND PRODUCTION THEREOF

Ewald Urbschat Koln-Mulheim, and Ferdinand Grewe, Koln-Stammheim, Germany, assignors to Farbenfabriken Bayer Aktiengesellschaft, Leverkusen, Germany, a corporation of Germany No Drawing. Application January 16, 1958
Serial No. 709,178

Claims priority, application Germany February 7, 1957

6 Claims. (Cl. 260—152)

The present invention relates to and has as its objects phenylazo formamides and a process for their production. Generally the compounds of the present invention may be represented by the following formula

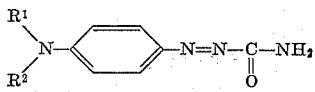

in which $R^1$ stands for hydrogen, a lower alkyl group say up to about 4 carbon atoms, a phenyl group or a phenyl-substituted lower alkyl group, $R^2$ may have the same significance, but may not be hydrogen; at last it is also possible that $R^1$ and $R^2$ form a nitrogen containing heterocyclic ring system.

Phenylazo formamides with basic substitutents in the phenyl nucleus such as p-aminophenylazo formamide, are already known as biologically active and therefore can be used for combating pests. It is also known that the aforesaid simplest representative of this class is obtainable by reduction of the quinone-oxime-semicarbazone and oxidation of the hydrazo compound primarily obtained. It is not possible, however, to obtain compounds with a substituted amino group according to this process. Since there are among these compounds some of especially great biological activity, the possibility of producing them in a simple manner is of great importance.

It has now been found that the aforesaid compounds are obtainable in a simple manner, and in a good yield and degree of purity by diazotising in conventional manner p-phenylene-diamines mono- or disubstituted at a nitrogen atom and treating the resulting diazonium salts with solutions of salts of cyanic acid. The corresponding diazo cyanides thus separate out in good yield, being completely stable. By saponification with cold diluted mineral acids they are converted into azoformamides. This reaction may be exemplified by the following scheme of the production of p-dimethyl-amino-phenylazo formamide:

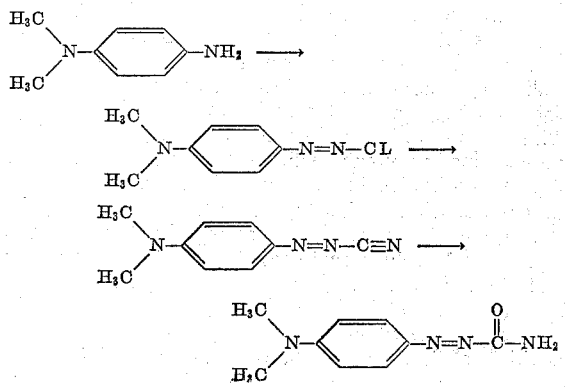

The reaction of the diazonium salts generally should be carried out using such salts of sulfuric acid or hydrochloric acid and reacting those with sodium cyanate or potassium cyanate. Diazotation as it is known has to be carried out at lower temperatures, but also the further reaction with the alkali cyanate should be performed in the cold, say below about 0 to +5° C. Saponification of the diazocyanate may be performed at about room temperature and advantageously by means of hydrochloric acid.

The compounds of the present application are preferably used with the addition of solid or liquid fillers or diluents, for example, as fungicidal sprays or dusts. The quantities to be used vary depending on the degree of the fungus-attack and the type of the fungus to be combatted. The compounds according to the invention are usually mixed with amounts of fillers or diluents so that a concentration of about 1 to 10% is obtained. If liquid concentrates are desired, an auxiliary solvent may be added, and an emulsifier if necessary, if aqueous emulsions are to be produced.

Suitable solid extenders or diluents are talc, chalk, bentonite, and the like. If later slurry compositions are desired to these dusts preparations a certain amount of emulsifier should be added so that the composition may be emulsified with water. Liquid compositions advantageously are of aqueous nature. The mixture of auxiliary solvent such as dimethyl formamide or acetone, emulsifiers such as a commercially available anionic, cationic or nonionic type such as e.g. a polyglycol ether of benzyl hydroxy diphenyl, and active ingredient is diluted with water to the desired concentration for combating fungi.

As examples of diseases brought about by fungus infection which can be combated according to the invention, there may be mentioned potato late and early blight, leaf spot disease of celery, and the like. Some of the compounds of the present application possess, moreover, a good nematicidal and rodenticidal activity.

The special utility of the inventive compounds may be seen from the following example: tomato plants (Bonny Best) of about 6 inches height, planted in pots of about 4 inches diameter in standard soil in the green house, are spread to the run off with suspensions which have been prepared as follows: same amounts of active ingredient and acetone have been mixed with 20% by weight referred to active ingredient of a benzyl hydroxy diphenyl polyglycol ether (commercial product containing about 10 to 15 glycol residues). This premixture is further diluted with water to the concentration shown in the table below. After treatment of the plants the pots are placed for 24 hours at temperatures to 24° C. in an atmosphere of a humidity of 60 to 70% to allow the spray to dry. After that the plants are inoculated with suspensions of phytophthora infestans in aqua-bidestilata and placed in humid chambers at a temperature of about 18° C.; the plants are randomized. Humidity in the humid chambers is 100% for 48 hours, and is not allowed to be lower than 90% during the next 4 days. In toto after 6 days after inoculation the results are evaluated. Each pinna of the leaves of the plant has been evaluated by numbers 0 to 4; 0 means no damage, 4 means pinna completely destroyed, 1, 2 and 3 are intermediate values. Each pinna is multiplied with the evaluation number and the total of pinna then is summarized. The number thus obtained is divided through the number of pinna. The control number that means the status of the untreated plants has been set 100, and the status of treated plants has been numbered in percent of the aforementioned control value.

As test material for comparing there has been used zinc ethylene bis dithiocarbamate. From the results it is

| In vivo | | Activity |
| --- | --- | --- |
| Conc. | $(CH_3)_2N-C_6H_4-(P)-N=N-\overset{\overset{O}{\|}}{C}-NH_2$ | Zinc ethylene bis-di-thiocarbamate. |
| 250 p.p.m. | 0.3 | 21. |
| 125 p.p.m. | 0.3 | 28. |
| 62.5 p.p.m. | 9 | 47. |

The following examples illustrate the production of the compounds according to the invention.

EXAMPLE 1

*p-Dimethylaminophenyl-azoformamide*

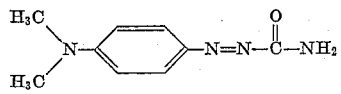

136 grams of p-aminodimethyl aniline are diazotized in 1 litre of water and 400 millilitres of concentrated hydrochloric acid at 0–5° C. with 70 grams of sodium nitrite. The resultant diazonium salt solution is run with good stirring into a solution of 106 grams of sodium carbonate in 500 millilitres of water to which 2 kilograms of ice are added. 165 grams of potassium cyanide in 350 millilitres of water are subsequently added to the mixture. After stirring for a further 3 hours, the dark red precipitate of the diazo cyanide is filtered off with suction, washed with water and dried at 50° C. The yield is 165 grams. From acetone dark red needles are obtained of M.P. 152° C. (decomposition).

330 grams of this cyanide are introduced at 15–20° C. into a mixture of 1.4 litres of water and 700 millilitres of concentrated hydrochloric acid and stirred for 8 hours. After standing overnight the solution thus formed is treated with 1 kilogram of ice and rendered ammoniacal. The light brown precipitate is filtered off by suction, washed with water and dried. Yield 340 grams, M.P. 153° C. (decomposition). The crude product is sufficiently pure for practical use as fungicide. It may be redissolved for example from methanol and chloroform thus forming orange-red crystals and decomposing at 167° C.

EXAMPLE 2

*p-Diethylaminophenyl-azoformamide*

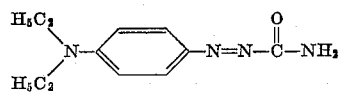

164 grams of p-aminodiethyl aniline are diazotized as indicated in Example 1 and reacted with potassium cyanide. The diazo cyanide (183 grams) obtained as intermediate is a dark red powder which may be redissolved from acetone forming dark red crystals which decompose at 117° C.

110 grams of the crude product are stirred at 15–20° C. for 8 hours in 460 millilitres of water and 230 millilitres of concentrated hydrochloric acid and allowed to stand overnight. The mixture is then diluted with twice its volume of water filtered, and the filtrate is rendered ammoniacal after the addition of ice. 100 grams of a brown product are obtained which forms, after redissolving in methanol, orange-red crystals which decompose at 143° C.

EXAMPLE 3

*p-Cyclotetramethylene-iminophenyl-azoformamide*

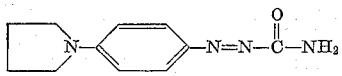

117.5 grams of the hydrochloride of p-cyclotetramethylene-imino-aniline are diazotized at 0–5° C. in 500 millilitres of water and 200 millilitres of concentrated hydrochloric acid, with 35 grams of sodium nitrite in 70 millilitres of water. This solution is then run into 53 grams of sodium carbonate in 250 millilitres of water and 1 kilogram of ice. 160 grams of potassium cyanide in 500 millilitres of water are then added to the mixture and the dark red precipitate of the cyanide is filtered off by suction after 3 hours. Yield 100 grams of a dark red powder which, redissolved from acetone, forms red crystals which decompose at 124° C.

47 grams of the crude product are stirred at 15–20° C. into a mixture of 200 millilitres of water and 100 millilitres of concentrated hydrochloric acid for 9 hours and allowed to stand for 40 hours (while stirring from time to time). The solution thus obtained is diluted with water, filtered and rendered ammoniacal after the addition of ice. The dark brown precipitate (40 grams) yields upon redissolution dark brown crystals which decompose at 172° C.

EXAMPLE 4

*p-Methylbenzylaminophenyl-azoformamide*

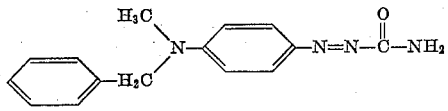

38.5 grams of diazo cyanide are obtained in the usual manner from 67 grams of the hydrochloride of 4-aminomethylbenzyl aniline. The product forms, after being redissolved in acetone, red crystals which decompose at approximately 146° C. 31 grams of the crude product are stirred in 250 millilitres of hydrochloric acid (1:1) at 15–20° C. for 9 hours, and then allowed to stand. After about 48 hours the mixture is diluted with 500 millilitres of water and the filtered solution made ammoniacal, with the addition of ice. 30 grams of a brown powder are thus obtained. After redissolving in methanol it forms brown crystals which decompose at about 142° C.

EXAMPLE 5

*p-Methylaminophenyl-azoformamide*

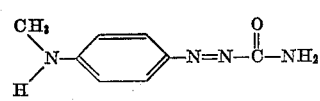

82 grams of 4-amino-methylacetanilide are introduced with cooling into 250 millilitres of concentrated hydrochloric acid and diazotized with 35 grams of sodium nitrite in 50 millilitres of water. The solution is heated to 70° C. for 1 hour to split off the acetyl soap. After standing overnight, it is diluted with 500 millilitres of water and filtered. 1.5 kilograms of ice are added to the filtrate and there are introduced dropwise 90 grams of sodium carbonate in 500 millilitres of water and then 100 grams of sodium cyanide in 250 millilitres of water. After stirring for a further 3 hours, the dark precipitate is filtered off with suction, washed and dried. Yield: 50 grams. After redissolving in acetone (with the addition of water to the filtrate) dark blue lustrous crystals are obtained which decompose at approximately 120° C.

70 grams of the crude product are stirred in 300 millilitres of hydrochloric acid (1:1) at 15–20° C. for 6 hours and allowed to stand overnight. The separated crystals are dissolved by diluting with 1.5 litres of water. The solution is filtered and rendered ammoniacal after the addition of ice. The initially resinous precipitate (67 grams) which rapidly becomes crystalline is redissolved in methanol. Violet crystals, M.P. 142–143° C.

EXAMPLE 6
*p-Phenylamino-phenylazoformamide*

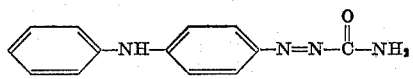

35 grams of p-phenyl aminophenyl diazocyamide obtained as usual from p-aminodiphenyl amine (the raw product is a red powder which decomposes at 121° C. are introduced into a cooled mixture of 100 millilitres of water and 200 millilitres of concentrated hydrochloric acid. After 48 hours the dark suspension is made ammoniacal while adding ice. The dark precipitate obtained is filtered off with suction, washed and dried. Yield: 32 grams. For purification it is dissolved in boiling alcohol, the solution is filtered over carbon and the filtrate is decomposed with the same amount of boiling water. While cooling there are obtained dark brown crystals, which are decomposable at 149° C.

We claim:

1. Phenylazo formamides, substituted by substituted amino groups, of the following formula

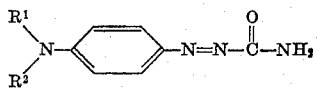

in which $R^1$ is a member selected from the group consisting of hydrogen and lower alkyl, $R_2$ stands for a member selected from the group consisting of lower alkyl, phenyl and benzyl, and in which $NR^1R^2$ can form a nitrogen containing lower carbo cylic ring system.

2. The compound of the following formula

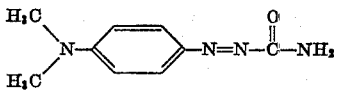

3. The compound of the following formula

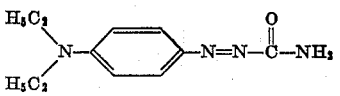

4. The compound of the following formula

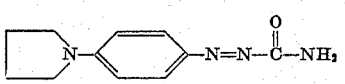

5. The compound of the following formula

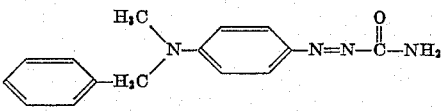

6. The compound of the following formula

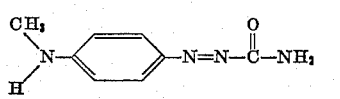

References Cited in the file of this patent

Hantzsch et al.: Berichte, vol. 28, pp. 666–676 (1895).
Borsche et al.: Chem. Abs., vol. 2, p. 132 (1908).
Migrdichian: Org. Synthesis, vol. 1, pp. 369–370 (1957).